US012663786B2

(12) United States Patent
Han et al.

(10) Patent No.: US 12,663,786 B2
(45) Date of Patent: Jun. 23, 2026

(54) METHOD OF PREDICTING AN OPTIMAL PROCESS CONDITION MODEL TO IMPROVE A YIELD OF A SEMICONDUCTOR FABRICATION PROCESS AND METHOD OF CONTROLLING A SEMICONDUCTOR FABRICATION PROCESS BASED ON AN OPTIMAL PROCESS CONDITION MODEL

(71) Applicant: SK hynix Inc., Icheon-si (KR)

(72) Inventors: Jin Hee Han, Icheon-si (KR); Seong Min Ma, Icheon-si (KR); Deuk Nyeon Lee, Icheon-si (KR); Chang Hwan Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 587 days.

(21) Appl. No.: 18/295,252

(22) Filed: Apr. 3, 2023

(65) Prior Publication Data

US 2024/0176339 A1 May 30, 2024

(30) Foreign Application Priority Data

Nov. 25, 2022 (KR) ......................... 10-2022-0160563

(51) Int. Cl.
G05B 19/418 (2006.01)
G05B 13/02 (2006.01)
(Continued)

(52) U.S. Cl.
CPC ....... G05B 19/41885 (2013.01); G05B 13/02 (2013.01); G05B 23/02 (2013.01);
(Continued)

(58) Field of Classification Search
CPC .......... G06N 20/00; G06N 7/02; G05B 13/02; G05B 23/02; H01L 21/66; H01L 21/67; H01L 21/00
(Continued)

(56) References Cited

U.S. PATENT DOCUMENTS 6,723,574 B1 * 4/2004 Bailey, III .............. H01L 22/20
438/10
6,922,603 B1 * 7/2005 Bailey, III .............. H01L 22/20
700/121

(Continued)

OTHER PUBLICATIONS

"Deep Learning Based Virtual Metrology in Semiconductor Manufacturing Processes" by Harshit Bokadia. A thesis submitted to the School of Graduate Studies Rutgers, the State University of New Jersey in partial fulfillment of the requirements for the degree of Master of Science Graduate Program in Industrial and Systems Engineering Written under the direction of Myong K. Jeong and approved by. Oct. 2018.

*Primary Examiner* — Ronald D Hartman, Jr.

(57) ABSTRACT

In a method of predicting an optimal process condition model for a semiconductor fabrication process, process parameter information of a unit process in the semiconductor fabrication process may be collected. First characteristics information of objects to be processed before the unit process and second characteristic information of processed objects after the unit process may be extracted. Process global uniformity (PGU) may be calculated using the first characteristic information and the second characteristic information. A data set of the unit process may be created using the process parameter information and the PGU. A virtual process environment function of the unit process may be created using the data set. The optimal process condition model of the unit process may be created using the virtual process environment function.

15 Claims, 2 Drawing Sheets

(51) Int. Cl.
    *G05B 23/02*         (2006.01)
    *G06N 7/02*          (2006.01)
    *G06N 20/00*        (2019.01)

(52) U.S. Cl.
    CPC ...... *G05B 2219/32333* (2013.01); *G06N 7/02*
                  (2013.01); *G06N 20/00* (2019.01)

(58) Field of Classification Search
    USPC ......................................................... 700/121
    See application file for complete search history.

(56)                    References Cited

U.S. PATENT DOCUMENTS

| | | | |
|---|---|---|---|
| 7,018,855 B2 * | 3/2006 | Kota ....................... | H01L 22/20 |
| | | | 438/18 |
| 7,567,700 B2 * | 7/2009 | Funk ................... | G03F 7/70525 |
| | | | 382/144 |
| 8,682,466 B2 * | 3/2014 | Ko ..................... | G05B 23/0221 |
| | | | 700/109 |
| 10,734,293 B2 | 8/2020 | David | |
| 2007/0100487 A1 * | 5/2007 | Cheng .............. | G05B 19/41875 |
| | | | 700/51 |
| 2007/0238201 A1 * | 10/2007 | Funk ....................... | H01L 22/12 |
| | | | 257/E21.53 |
| 2009/0307636 A1 * | 12/2009 | Cases ................... | G06F 30/327 |
| | | | 716/132 |
| 2011/0265578 A1 * | 11/2011 | Johnson ................ | G01L 5/0047 |
| | | | 73/800 |
| 2013/0339919 A1 * | 12/2013 | Baseman ......... | G05B 19/41875 |
| | | | 716/136 |
| 2014/0031969 A1 * | 1/2014 | Baseman ............ | G05B 13/048 |
| | | | 700/121 |
| 2016/0041548 A1 * | 2/2016 | Chung .............. | G05B 23/0221 |
| | | | 700/108 |

\* cited by examiner

FIG. 1

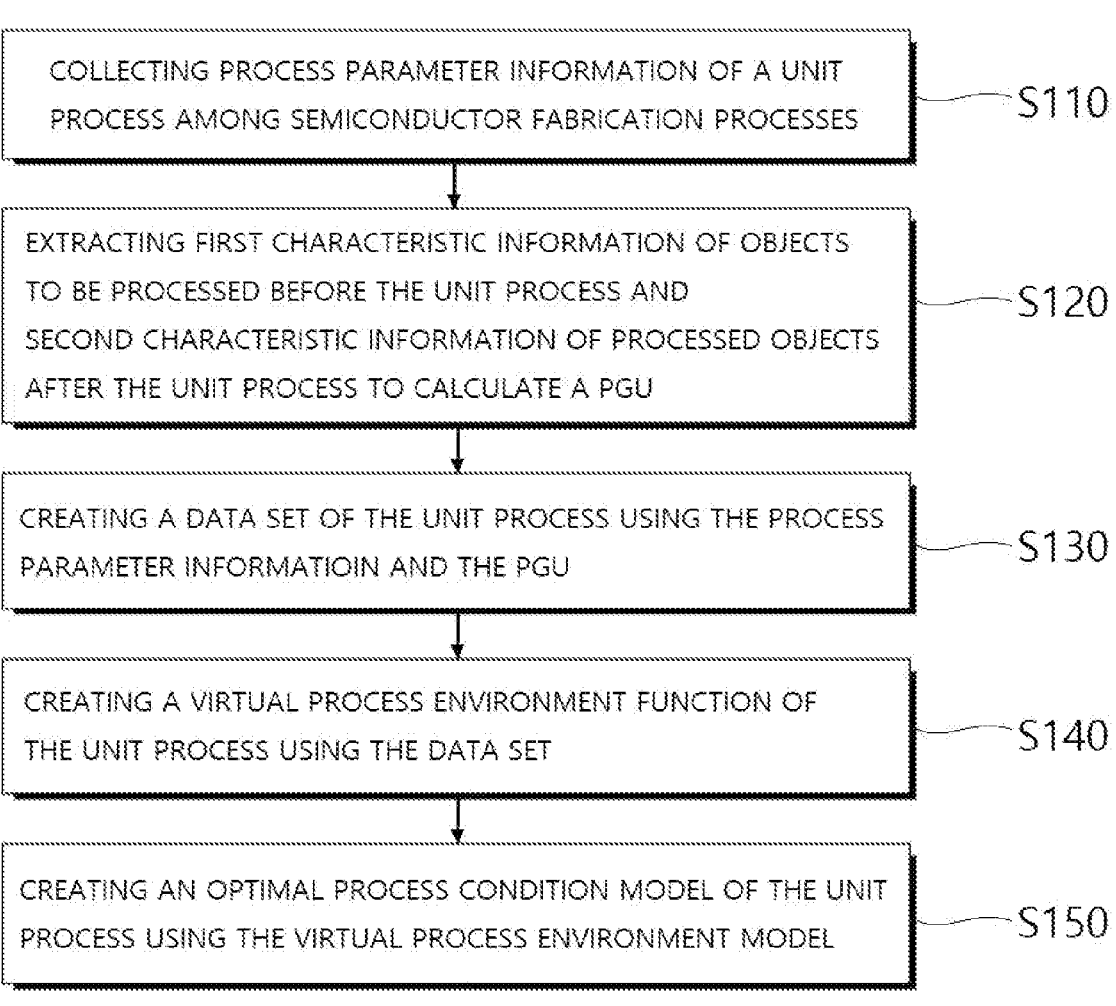

COLLECTING PROCESS PARAMETER INFORMATION OF A UNIT PROCESS AMONG SEMICONDUCTOR FABRICATION PROCESSES ⌐S110

EXTRACTING FIRST CHARACTERISTIC INFORMATION OF OBJECTS TO BE PROCESSED BEFORE THE UNIT PROCESS AND SECOND CHARACTERISTIC INFORMATION OF PROCESSED OBJECTS AFTER THE UNIT PROCESS TO CALCULATE A PGU ⌐S120

CREATING A DATA SET OF THE UNIT PROCESS USING THE PROCESS PARAMETER INFORMATIOIN AND THE PGU ⌐S130

CREATING A VIRTUAL PROCESS ENVIRONMENT FUNCTION OF THE UNIT PROCESS USING THE DATA SET ⌐S140

CREATING AN OPTIMAL PROCESS CONDITION MODEL OF THE UNIT PROCESS USING THE VIRTUAL PROCESS ENVIRONMENT MODEL ⌐S150

FIG. 2

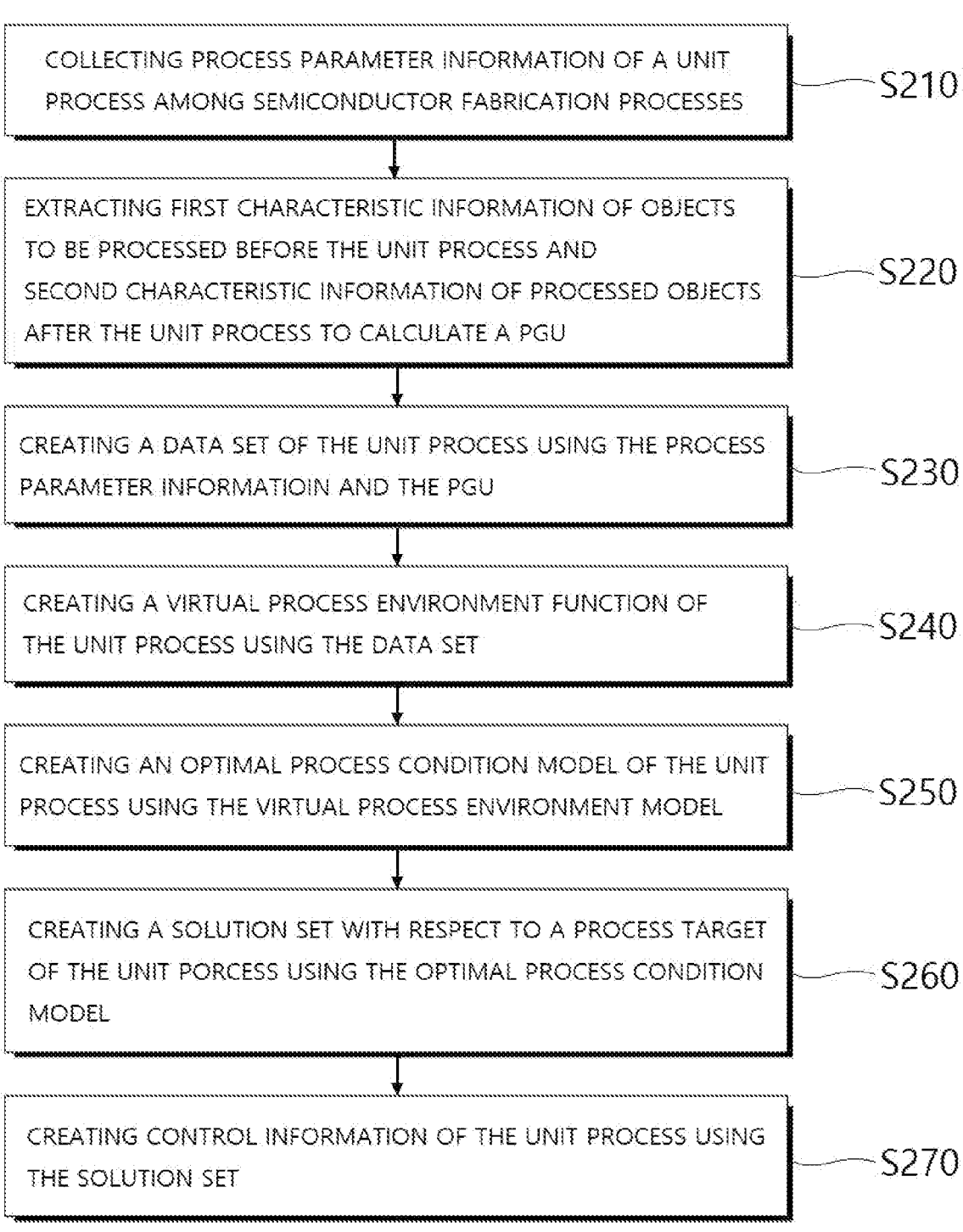

COLLECTING PROCESS PARAMETER INFORMATION OF A UNIT PROCESS AMONG SEMICONDUCTOR FABRICATION PROCESSES ~S210

EXTRACTING FIRST CHARACTERISTIC INFORMATION OF OBJECTS TO BE PROCESSED BEFORE THE UNIT PROCESS AND SECOND CHARACTERISTIC INFORMATION OF PROCESSED OBJECTS AFTER THE UNIT PROCESS TO CALCULATE A PGU ~S220

CREATING A DATA SET OF THE UNIT PROCESS USING THE PROCESS PARAMETER INFORMATIOIN AND THE PGU ~S230

CREATING A VIRTUAL PROCESS ENVIRONMENT FUNCTION OF THE UNIT PROCESS USING THE DATA SET ~S240

CREATING AN OPTIMAL PROCESS CONDITION MODEL OF THE UNIT PROCESS USING THE VIRTUAL PROCESS ENVIRONMENT MODEL ~S250

CREATING A SOLUTION SET WITH RESPECT TO A PROCESS TARGET OF THE UNIT PORCESS USING THE OPTIMAL PROCESS CONDITION MODEL ~S260

CREATING CONTROL INFORMATION OF THE UNIT PROCESS USING THE SOLUTION SET ~S270

1

METHOD OF PREDICTING AN OPTIMAL PROCESS CONDITION MODEL TO IMPROVE A YIELD OF A SEMICONDUCTOR FABRICATION PROCESS AND METHOD OF CONTROLLING A SEMICONDUCTOR FABRICATION PROCESS BASED ON AN OPTIMAL PROCESS CONDITION MODEL

CROSS-REFERENCES TO RELATED APPLICATION

The present application claims priority under 35 U.S.C. § 119(a) to Korean application number 10-2022-0160563, filed on Nov. 25, 2022, in the Korean Intellectual Property Office, which is incorporated herein by reference in its entirety.

BACKGROUND

1. Technical Field

Various embodiments generally relate to a method of predicting an optimal process condition model to improve a yield of a semiconductor fabrication process and a method of controlling a semiconductor fabrication process based on an optimal process condition model. More particularly, embodiments are directed to a method of creating an optimal process condition model by collecting parameters of a unit process in a semiconductor fabrication process and of a total process uniformity to evaluate a unit process and by using an artificial intelligence (AI) technology to improve efficiency of the unit process.

2. Related Art

Generally, in a semiconductor fabrication field, yield improvement and yield management may include maximizing the number of semiconductor devices manufactured from one wafer and maintaining and improving a ratio of normal semiconductor devices operated under the same electrical characteristics. The yield of the semiconductor devices in the semiconductor fabrication field may an important indicator representing the market competitiveness of a semiconductor fabrication maker.

However, a unit process for fabricating the semiconductor devices may be affected by various process parameters and equipment parameters so that it may be very difficult to recognize factors for determining the yield. Thus, yield improvement may be restricted to using a simple statistical analysis or an empirical research.

Recently, semiconductor fabrication equipment may be automated so that massive data may be generated from the semiconductor fabrication equipment. The data may be input into a database. The database may be used for recognizing process conditions and for improving the yield of semiconductor devices.

Further, as a size of the wafer increases and a design unit of the semiconductor device continues to be refined, the number of semiconductor chips manufactured from one wafer may be greatly increased. A distribution of characteristic values may have great influence on the yield due to the large size of the wafer and the fine design unit.

However, while statistical analysis may accurately analyze a small quantity of the data, in the semiconductor fabrication field using massive data, the amount of the data and the factors may be greatly increased so that the massive data may not be accurately analyzed. Thus, it may be difficult to manage the yield of semiconductor devices.

SUMMARY

Example embodiments provide a method of predicting an optimal process condition model to improve a yield of a semiconductor fabrication process using process parameters of a unit process and a total process uniformity of a processed product in the unit process.

Example embodiments also provide a method of controlling a semiconductor fabrication process based on an optimal process condition model to improve a yield of semiconductor devices having uniform quality by providing the unit process with the same process capacity.

According to example embodiments, there may be provided a method of predicting an optimal process condition model to improve a yield of a semiconductor fabrication process. In the method of predicting the optimal process condition model, process parameter information of a unit process in the semiconductor fabrication process may be collected. First characteristics information of objects to be processed before the unit process and second characteristic information of the processed objects after the unit process may be extracted. Process global uniformity (PGU) may be calculated using the first characteristic information and the second characteristic information. A data set of the unit process may be created using the process parameter information and the PGU. A virtual process environment function of the unit process may be created using the data set. The optimal process condition model of the unit process may be created using the virtual process environment function.

According to example embodiments, there may be provided a method of controlling a semiconductor fabrication process based on the optimal process condition model. In the method of controlling the semiconductor fabrication process, process parameter information of a unit process in the semiconductor fabrication process may be collected. First characteristics information of the objects to be processed before the unit process and second characteristic information of the processed objects after the unit process may be extracted. Process global uniformity (PGU) may be calculated using the first characteristic information and the second characteristic information. A data set of the unit process may be created using the process parameter information and the PGU. A virtual process environment function of the unit process may be created using the data set. The optimal process condition model of the unit process may be created using the virtual process environment function. A process capacity target of the unit process may be set. A solution set with respect to the process capacity target of the unit process may be created using the optical process condition model. Control information of the unit process may be created using the solution set.

According to example embodiments, the virtual process environment function of the unit process may be created based on the process parameters of the objects to be processed before the unit process and the PGU of the processed objects after the unit process. The optimal solution set for controlling the unit process may be calculated using the virtual process environment function. Thus, a yield of the semiconductor fabrication process may be greatly improved and efficiency of human resources and material resources may be maximized.

Further, each of the unit processes may have a same process capacity to improve the yield of the semiconductor device and manufacture the semiconductor devices having same quality.

BRIEF DESCRIPTION OF THE DRAWINGS

The above and another aspects, features and advantages of the subject matter of the present disclosure will be more clearly understood from the following detailed description taken in conjunction with the accompanying drawings, in which:

FIG. 1 is a view illustrating a method of predicting an optimal process condition model to improve a semiconductor fabrication process in accordance with example embodiments of the disclosure; and FIG. 2 is a view illustrating a method of controlling a semiconductor fabrication process based on an optimal process condition model in accordance with example embodiments.

DETAILED DESCRIPTION

In example embodiments, a process global uniformity (PGU) may be uniformity of changed characteristics with respect to processed objects after a unit process.

The PGU may include at least one of geometrical characteristic information, chemical characteristic information and electrical characteristic information of the processed objects.

Particularly, the geometrical characteristic information may include morphological information such as a thickness, a size, etc. The electrical characteristic information may include crystallinity, a resistance, a current-voltage characteristic, etc. The chemical characteristic information may include a composition, a concentration, etc.

More particularly, the objects to be processed may include a wafer. When the unit process may be performed to form a layer on a processed wafer, the PGU may include uniformity with respect to at least one characteristic of a size, a shape and a thickness of the layer.

Further, when the unit process may include an etch process for etching the wafer, the PGU may include uniformity of a thickness removed by the etch process.

The PGU may include information with respect to uniformity of a plurality of characteristics as well as uniformity of a single characteristic change shown in the processed object after the unit process. The PGU may also include information with respect to uniformity of characteristic changes besides a process goal. The PGU may include information with respect to changed values by the unit process, not information of a single item such as the thickness. Thus, the PGU may include the information with respect to the geometrical characteristics, the electrical characteristics and the chemical characteristics of the processed objects changed by the unit process. That is, when an additional deformation as well as the process goal may be generated, the PGU may further include information with respect to uniformity of characteristics of deteriorations, property reduction, etc., of the objects to be processed after the unit process.

Further, the PGU may be uniformity recognized from a plurality of the processed objects by the unit process using same fabrication equipment.

Here, the uniformity of total characteristics shown in the processed objects after the unit process may be represented by "global". In contrast, a characteristic value in a specific region in the processed object may be represented by "local".

When the unit processes with respect to a wafer may have the same process capacity, a yield of products manufactured from one wafer may be increased. Thus, a semiconductor fabrication maker may use a lot of effort and resources for improving the PGU with respect to the unit process.

Further, in example embodiments, the objects to be processed may include at least one of a bare wafer, a unit wafer, a die, a chip and a semiconductor device. The objects to be processed may correspond to a material before the unit process.

FIG. 1 is a view illustrating a method of predicting an optimal process condition model to improve a semiconductor fabrication process in accordance with example embodiments of the disclosure.

Referring to FIG. 1, a method of predicting an optimal process condition model may include step S110 for collecting process parameter information with respect to a unit process, step S120 for calculating a PGU, step S130 for creating a data set with respect to the unit process, step S140 for creating a virtual process environment function with respect to the unit process and step S150 for creating the optimal process condition model with respect to the unit process.

In step S110 for collecting the process parameter information with respect to the unit process, the process parameter information with respect to at least one unit process in the semiconductor fabrication process is collected.

The process parameter information may include information related to a process condition for performing the unit process.

Particularly, the wafer may be processed by various unit processes, using multiple unit process apparatuses, to form a semiconductor device. A unit process apparatus may perform a unit process based on process parameters such as a process condition, a process target, etc.

Thus, the process parameter information may include at least one of a process target value and a process condition information.

The process target value may include information about the process target for use in processing the objects to be processed by the unit process. For example, the target process information may include information with respect to the target value of the final geometrical, electrical and chemical characteristics of the processed object.

The process condition information may include information about the process conditions used with the unit process apparatus. The process condition information may include information related to controls of the unit process apparatus such as a process pressure, a process temperature, a process time, a process period, a number of a process performance, a kind of a process gas, a kind of a process material, a flux of a supply gas, an applying power source, a bias voltage, an impedance, an exposing amount, etc., as non-limiting examples.

The unit process may include at least one of the semiconductor fabrication processes.

For example, the unit process may be at least one of an oxidation process, a photo process, a diffusion process, a thin film process, a metallization process, an etch process, a CMP process and a cleaning process.

Further, while the unit process may be a single process, embodiments are not limited thereto. When a plurality of the unit processes may be successively performed, the process parameter information with respect to the unit processes may be collected.

In step S120 for calculating the PGU, before the unit process, first characteristic information of the objects to be processed may be extracted. After the unit process, second characteristic information of the processed objects may be extracted. The PGU may be calculated using the first characteristic information and the second characteristic information.

The PGU may be the uniformity with respect to changed characteristics when comparing objects to be processed, from which information can be extracted before the unit process, and processed objects after the unit process from which information can be collected.

For example, when the unit process is an etch process, a specific region of the processed objects may be removed so that the objects to be processed may have a deformed portion. When the unit process is a deposition process, a layer may be formed on the objects to be processed so that the processed objects may have a growing layer. When the unit process is an oxidation process, a chemically deformed portion may be generated at the processed objects compared to the objects to be processed.

Particularly, when the wafer is processed by the unit process, at least one characteristic of an appearance of the wafer, a composition, an electrical characteristic and crystallinity may be collected. When the wafer is processed by the unit process, the PGU may be the uniformity of the changed characteristics on the total wafer.

The PGU may be calculated by comparing the first characteristic information with the second characteristic information. The first characteristic information is collected from the objects to be processed in a state prior to processing in the unit process, and the second characteristic information is collected from the processed object in the unit process. That is, the PGU may be the uniformity of the characteristics of the processed objects with respect to the geometrical characteristics, the chemical characteristics, the electrical characteristic, the crystallinity, etc. The geometrical characteristic may include a thickness, a critical dimension, etc., of a material growing, removed or deformed by the unit process. The chemical characteristic may include at least one of the composition and the concentration of a component increased or decreased by the unit process. The electrical characteristic may include a resistance increased or decreased by the unit process. The crystallinity may be increased or decreased by the unit process. The PGU may be calculated using various measurement apparatuses. In order to calculate the uniformity of the total wafer processed by the unit process, objects to be processed before the unit process and the processed objects after the unit process may be measured at the same position to obtain the PGU.

The PGU may be collected using various test apparatuses for testing the semiconductor device.

For example, when the unit process is a thin film process, a layer may be formed on the wafer. A thickness of the layer on the wafer may be measured to calculate the PGU. The thickness of the layer may be measured using a measurement apparatus such as an in-line ellipsometer.

Alternatively, when the unit process is an etch process, a layer on the wafer may be etched using a milling apparatus for irradiating an ion beam on the wafer, a CMP apparatus, a dry etch apparatus and a wet etch process. An etch rate may be measured to calculate the PGU.

Thus, the PGU may include the information closely related to the efficiency and the yield of a process apparatus for performing the unit process.

The PGU information may include information with respect to the changed characteristics by the unit process as well as single information not affected by the unit process. Further, the PGU information may include information with respect to properties or characteristics that deteriorate or decrease as a result of the unit process.

Additionally, in step S120 for calculating the PGU, the first characteristic information and the second characteristic information may be pre-processed to create the PGU information.

When a plurality of same process apparatuses are used or the unit process is performed under different process conditions, although the same process apparatus may be used, the processed object may have different characteristics. This may be due to the process apparatus or the process condition in accordance with the characteristics, or the process conditions of the process apparatus. Further, the first characteristic information and the second characteristic information may include a plurality of information corresponding to the process parameters as well as the single information.

Further, the processed object may have different characteristics in accordance with performance deterioration caused by using the process apparatus for a long time, or in accordance with with sudden improvements by changing parts of the process apparatus.

Therefore, the characteristic information of the wafers before the unit process and the characteristic information and coordinate information of the wafers after the unit process may be collected. The characteristic information and the coordinate information may be pre-processed to calculate the PGU represented by a function of a polynomial-time equation.

The PGU represented by the function of the polynomial-time equation may be calculated by a polynomial fitting method of pre-processing the characteristic information before and after the unit process. The PGU represented by the function of the polynomial-time equation may be obtained by approximating the characteristic information to an nth degreed polynomial. The PGU represented by the function of the polynomial-time equation may accurately represent the unit process so that the PGU may be a new indicator. The indicator may be learned in following learning steps.

When the unit process may be performed using a batch type process apparatus configured to simultaneously process the wafers, the PGU represented by the function of the polynomial-time equation with respect to each of the wafers may be calculated. The polynomial fitting method may be applied to each of the wafers processed by the batch type process apparatus to collect a coefficient of the highest degree. The coefficient of the highest degree may represent a global geometrical characteristic of the PGU.

For example, when the objects to be processed may include wafers, the wafers may be loaded into a cassette. The wafers processed by the unit process may also be loaded into the cassette. Coefficients of the highest degrees collected by heights of wafer slots may be arranged to repeat performance of the polynomial fitting method. The PGU with respect to all of the wafers using a batch type process apparatus may be recognized using the created coefficient information of the function by the method.

The coefficient information of the highest degree may be learned in the following learning step. Thus, when the wafer is processed by the unit process using a batch type process apparatus, the coefficient information of the highest degree may be applied to the calculation of the PGU.

In step S130 for creating the data set with respect to the unit process, the data set may be created using the PGU and the process parameter information.

The data set may include an X-variable corresponding to the process parameter information and a Y-variable corresponding to the PGU. That is, the data set may include the Y-variable corresponding to the X-variable. Thus, the data set may include the PGU with respect to the processed object after the unit process corresponding to the process parameter information.

In step S140 for creating the virtual process environment function with respect to the unit process, the virtual process environment function may be created using the data set.

A correlation between the X-variable related to the process parameter and the Y-variable related to the PGU may be analyzed using an AI, i.e., a data learning technology. The correlation may be represented by a function to create the virtual process environment function.

The data learning technology may integrate new kinds of input data to create the virtual process environment function as a new access method with respect to the data analysis. The data learning technology may use various machine learning algorithms used for measuring the yield of the unit process.

For example, the virtual process environment function may be created using a supervised learning based regression analysis model.

Particularly, the supervised learning may set the data set as training data and infer a specific function from the training data to analyze the correlation between the X-variable and the Y-variable. The data set may include information required for the learning. A correlation between an independent variable (X-variable) and one dependent variable (Y-variable) may be modeled using the regression analysis model. An optimal regression coefficient may be derived from the characteristic (X-variable) and the determined value (Y-variable) based learning to create the virtual process environment function.

Further, after creating the virtual process environment function with respect to the unit process, a performance of the virtual process environment function may be verified to evaluate adequacy of the virtual process environment function.

The adequacy of the virtual process environment function may be evaluated using a statistic to verify the performance of the virtual process environment function. The adequacy of the virtual process environment function may be evaluated using a residual verification, a coefficient of determination $R^2$ calculation, an F-statistic verification, or a T-statistic verification. Particularly, the adequacy of the virtual process environment function may be evaluated using at least one of the residual verification, the coefficient of determination $R^2$ calculation and the F-statistic verification.

Particularly, the determination coefficient may be used as an evaluation indicator for evaluating the adequacy of the virtual process environment function. The determination coefficient may be a variable ratio of the Y-variable explainable by the X-variable in the regression model including the virtual process environment function obtained by the supervised learning based regression analysis model. Thus, the determination coefficient may be the verification indicator for evaluating the performance of the virtual process environment function. The determination coefficient may be a ratio of an explainable variable among a total variable, for example, having a range between 0 and 1. When the determination coefficient is in close proximity to 0, a linear correlation may not exist between the X-variable and the Y-variable. In contrast, when the determination coefficient is in close proximity to 1, the linear correlation may be high between the X-variable and the Y-variable. Thus, when the virtual process environment function is evaluated to determine the determination coefficient adjacent to 1, the virtual process environment function may be determined to be adequate to the yield measurement of the unit process. In contrast, when the virtual process environment function is evaluated to determine the determination coefficient adjacent to 0, the step for collecting the process parameter may be repeated to repeatedly perform the step for creating a new virtual process environment function.

The F-statistic verification may be an indicator for representing a significance of the virtual process environment function. The F-statistic verification may mean a verification statistic for verifying a statistical significance. A means of square error (MSE) with respect to an error ratio of the virtual process environment function may be calculated. A difference between a predicted value and a sample mean may be divided by a freedom degree to calculate a means of square regression (MSR) representing expressivity of the virtual process environment function with respect to the unit process. The F-statistic may be calculated using the MSE and a regression square average calculation value. The F-statistic may be calculated as a P-value. When the P-value may be no more than about 0.05, the F-statistic may be evaluated to have the statistical significance.

The adequacy of the virtual process environment function may be evaluated. When the virtual process environment function is determined to be adequate, an optimal process condition model may be created using the virtual process environment function by a following process.

In contrast, when the virtual process environment function is determined not to be adequate, the step for collecting the process parameter may be repeated to repeatedly perform the step for creating the virtual process environment function.

In step S150 for creating the optimal process condition model, the optimal process condition model may be created using the virtual process environment function.

The virtual process environment function may include the X-variable including the information with respect to the process condition and the process apparatus for performing the unit process and the Y-variable including the PGU. The optimal process condition model may be calculated by obtaining the variable for the unit process and applying the variable.

When a user sets a process capacity target, the optimal process condition model may create the solution set satisfying the process capacity target. In order to create the solution set, a number range of the process parameter in the solution set may be set.

The solution set may be created using a Genetic algorithm for creating various solution sets by applying a DNA crossover and a DNA variation.

Particularly, after calculating the optimal process condition model, the user may set the process target Y with respect to the unit process. The process target Y may be applied to the optimal process condition model to create the solution set X satisfying the process target.

In order to create the solution set, the number range of the process parameter of unit process in the solution set may be set.

Further, a plurality of the solution sets may be created in accordance with the process parameter of the unit process.

The solution sets may be created using the Genetic algorithm by applying the DNA variation and the DNA crossover.

Particularly, the Genetic algorithm may be a global optimization for simulating a biological evolution. The Genetic algorithm may be used for finding a solution of a problem showing a non-linear movement with respect to variables. The Genetic algorithm may create the optimal solution set with respect to the unit process. The Genetic algorithm may evaluate fitness from population. The Genetic algorithm may perform a selection, a crossover and a mutation to calculate the optimal solution set.

After calculating the solution set with respect to the process target of the unit process, the adequacy of the solution set may be evaluated.

The adequacy of the solution set may be evaluated using the determination coefficient calculation, the F-statistic verification, etc. The various solution sets may be created using the Genetic algorithm. The evaluation of the adequacy with respect to the created solution set may be repeated to induce the optimal solution set X.

The adequacy of the solution sets may be evaluated. When the solution set is adequate, the solution set may be selected. In contrast, when the solution set is not adequate, the solution set may need to be re-created or may not be selected.

Further, the determination coefficient of the solution set may be adjacent to 1, or the P-value may be the lowermost, so the corresponding solution set may be selected to create control conditions for controlling the unit process. For reference, if a specific solution set has a low determination coefficient close to 0 and a low p-value, it means that the process condition model of that solution set has low explanatory power for the unit process, but the process condition model is meaningful (better than not having a process condition model). If a specific solution set has a low determination coefficient close to 0 and a high p-value, it means that the explanatory power of the process condition model of the corresponding solution set is low and the process condition model is not meaningful (worst scenario). If a specific solution set has a high determination coefficient close to 1 and a low p-value, it means that the explanatory power of the process condition model for that solution set is high and the model is meaningful (good scenario). If a specific solution set has a high determination coefficient close to 1 and a high p-value, it means that the explanatory power of the process condition model for that solution set is high, but the process condition model is not meaningful (worthless). In this way, the adequacy can be tested to select the optimal solution set.

According to example embodiments, the virtual process environment function may be created based on the process parameter before the unit process and the PGU after the unit process. The optimal solution set for controlling the unit process may be calculated using the virtual process environment function. Thus, the yield of the semiconductor fabrication process may be greatly improved and the efficiency of the human and material resources may also be improved.

Particularly, the predicting method may enable realization of the AI based process development environment together with a stand-alone equipment with the process equipment and the in-situ metrology equipment and an automation system.

FIG. 2 is a view illustrating a method of controlling a semiconductor fabrication process based on an optimal process condition model in accordance with example embodiments.

Referring to FIG. 2, a method of controlling a semiconductor fabrication process may include step S210 for collecting process parameter information with respect to a unit process, step S220 for calculating a PGU, step S230 for creating a data set with respect to the unit process, step S240 for creating a virtual process environment function with respect to the unit process, step S250 for creating the optimal process condition model with respect to the unit process, step S260 for creating a solution set with respect to a process target of the unit process and step S270 for creating control information with respect to the unit process using the solution set.

The step S210 for collecting process parameter information with respect to the unit process, the step S220 for calculating a PGU, the step S230 for creating a data set with respect to the unit process, the step S240 for creating a virtual process environment function with respect to the unit process and the step S250 for creating the optimal process condition model with respect to the unit process may be illustrated with reference to FIG. 1. Thus, any further illustrations with respect to the same steps may be omitted herein for brevity.

In step S260, when the user sets the process target of the unit process, the solution set with respect to the process target may be created using the optimal process condition model.

The various solution sets may be created using Genetic algorithms. This process may be repeated to calculate the optimal solution set with respect to the process target of the unit process.

In step S270 for creating the control information of the unit process, the control information of the unit process may be created using the solution set. The process condition and the process equipment of the unit process may be controlled using the optimal control information. Thus, the unit processes may have the same process capacity to manufacture the processed object having the uniform quality.

The control information may include the process parameter calculated by the solution set. The process parameter may include process condition information of the process equipment for performing the unit process.

According to example embodiments, the unit processes may have the same process capacity to increase the yield of the processed objects.

The above described embodiments are intended to illustrate and not to limit the present teachings. Various alternatives and equivalents are possible. The teachings are not limited by the embodiments described herein. Nor are the teachings limited to any specific type of semiconductor device. Another additions, subtractions, or modifications are obvious in view of the present disclosure and are intended to fall within the scope of the appended claims.

What is claimed is:

1. A method of selecting an optimal process condition model for a semiconductor wafer fabrication process, the method comprising:

collecting a plurality of process parameter information for a unit process used in the semiconductor fabrication wafer process;

obtaining a plurality of first characteristic information of a test semiconductor wafer before performing the unit process and obtaining a plurality of second characteristic information of the test semiconductor wafer after performing the unit process;

calculating a process global uniformity (PGU) using the plurality of first characteristic information and the plurality of second characteristic information;

creating a data set corresponding to the unit process using the plurality of process parameter information and the PGU;

creating a virtual process environment function with respect to the unit process using the data set;

creating an optimal process condition model with respect to the unit process using the virtual process environment function, setting, by a user, at least one process target of the unit process, and performing the unit process using the at least one process target on a production semiconductor wafer, wherein the process global uniformity is calculated with respect to changes in values of two or more from among a thickness, a size, a shape, crystallinity, a resistance, a current-voltage characteristic, a composition, and a concentration, wherein the optimal process condition model includes a control information that satisfies a process capability target for performing the unit process, and wherein the control information comprises at least one of a plurality of information for performing the unit process selected from a process pressure, a process temperature, a process time, a process period, a number of a process performance, a kind of a process gas, a kind of a process material, a flux of a supply gas, an applying power source, a bias voltage, an impedance and an exposing amount.

2. The method of claim 1, wherein the unit process comprises at least one of an oxidation process, a photo process, a diffusion process, a thin film process, a metallization process, an etch process, a CMP process and a cleaning process.

3. The method of claim 1, wherein calculating the PGU comprises pre- processing the PGU using a polynomial fitting method.

4. The method of claim 1, wherein creating the virtual process environment function comprises creating the virtual process environment function using a supervised learning based regression analysis model from the data set.

5. The method of claim 1, wherein creating the virtual process environment function comprises verifying a capacity of the virtual process environment function.

6. The method of claim 5, wherein verifying the capacity of the virtual process environment function performs using at least one of a determination coefficient ($R^2$) calculation and an F-statistic verification.

7. The method of claim 1, wherein creating the optimal process condition model comprises:

creating a solution set of the unit process satisfying the at least one process target.

8. The method of claim 7, wherein creating the solution set of the unit process comprises:

creating a plurality of the solution sets with respect to the at least one process target using a DNA algorithm; and evaluating an adequacy of the solution sets to create an optimal solution set with respect to the at least one process target.

9. A method of performing a unit process in a semiconductor fabrication process, the method comprising:

collecting a plurality of process parameter information for the unit process of the semiconductor fabrication process;

obtaining a plurality of first characteristic information of a test semiconductor wafer before performing the unit process and obtaining a plurality of second characteristic information of the test semiconductor wafer after performing the unit process;

calculating a process global uniformity (PGU) using the plurality of first characteristic information and the plurality of second characteristic information;

creating a data set corresponding to the unit process using the plurality of process parameter information and the PGU;

creating a virtual process environment function with respect to the unit process using the data set;

creating an optimal process condition model with respect to the unit process using the virtual process environment function;

setting, by a user, at least one process target of the unit process, selecting, by a user, a process capability target for performing the unit process, creating a solution set with respect to the at least one process target of the unit process using the optimal process condition model;

creating a control information of the unit process using the solution set, and performing the unit process using the at least one process target and the process capability target on a production semiconductor wafer, wherein the process global uniformity is calculated with respect to changes in values of two or more from among a thickness, a size, a shape, crystallinity, a resistance, a current-voltage characteristic, a composition, and a concentration, wherein the optimal process condition model creates the control information that satisfies the selected process capability target, and wherein the control information comprises at least one of a plurality of information for performing the unit process selected from a process pressure, a process temperature, a process time, a process period, a number of a process performance, a kind of a process gas, a kind of a process material, a flux of a supply gas, an applying power source, a bias voltage, an impedance and an exposing amount.

10. The method of claim 9, wherein the unit process comprises at least one of an oxidation process, a photo process, a diffusion process, a thin film process, a metallization process, an etch process, a CMP process and a cleaning process.

11. The method of claim 9, wherein calculating the PGU comprises pre-processing the PGU using a polynomial fitting method.

12. The method of claim 9, wherein creating the virtual process environment function comprises creating the virtual process environment function using a supervised learning based regression analysis model from the data set.

13. The method of claim 9, wherein creating the virtual process environment function comprises verifying a capacity of the virtual process environment function.

14. The method of claim 13, wherein verifying the capacity of the virtual process environment function performs using at least one of a determination coefficient $R^2$ calculation and an F-statistic verification.

15. The method of claim 9, wherein creating the solution set of the unit process comprises:

creating a plurality of the solution sets with respect to the at least one process target using a DNA algorithm; and evaluating an adequacy of the solution sets to create the-an optimal solution set with respect to the at least one process target.

* * * * *

14